(12) United States Patent
Kawano et al.

(10) Patent No.: US 7,426,168 B2
(45) Date of Patent: Sep. 16, 2008

(54) HOLOGRAM ERASING METHOD AND HOLOGRAM ERASING APPARATUS

(75) Inventors: Katsunori Kawano, Ashigarakami-gun (JP); Jiro Minabe, Ashigarakami-gun (JP); Shin Yasuda, Ashigarakami-gun (JP); Tatsuya Maruyama, Minato-ku (JP); Norie Matsui, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 589 days.

(21) Appl. No.: 10/782,758

(22) Filed: Feb. 23, 2004

(65) Prior Publication Data

US 2005/0013231 A1    Jan. 20, 2005

(30) Foreign Application Priority Data

Jul. 15, 2003   (JP)   ............... 2003-197376

(51) Int. Cl.
*G11B 7/00*   (2006.01)
(52) U.S. Cl. ..................................... 369/103
(58) Field of Classification Search ............ None
See application file for complete search history.

(56) References Cited

U.S. PATENT DOCUMENTS 5,838,467 A * 11/1998 Curtis et al. ............... 359/3
6,281,993 B1 * 8/2001 Bernal et al. ............... 359/29
6,721,076 B2 * 4/2004 King et al. ................. 359/35
2001/0002895 A1   6/2001 Kawano et al.

FOREIGN PATENT DOCUMENTS

JP    A 2001-147634    5/2001
JP    A 2002-268102    9/2002
JP    A 2003-030926    1/2003

OTHER PUBLICATIONS

Moser, Christophe, and Demetri Psaltis, Holographic Memory with Localized Recording, Aug. 10, 2001, Applied Optics, vol. 40, No. 23, pp. 3909-3914.*

* cited by examiner

*Primary Examiner*—Wayne Young
*Assistant Examiner*—Adam R Giesy
(74) *Attorney, Agent, or Firm*—Oliff & Berridge, PLC (57) ABSTRACT

The present invention discloses a hologram erasing method, in which a predetermined hologram is erased by irradiating a predetermined region of a hologram recording medium in which the hologram to be erased is recorded with a reference light beam and a signal light beam holding a random data pattern at the same time. In this method, the signal light beam and the reference light beam interfere with each other in the medium, and a Fourier transform hologram recorded in the region where the interference occurs is destroyed and erased by interference light beam. That is, a data page for erasing including a random pattern is overwritten to erase an original data page. According to the present invention, the hologram recorded in the optical recording medium can be selectively and completely erased in a simple method.

24 Claims, 8 Drawing Sheets

VOLUME MULTIPLE RECORDING
CAN BE PERFORMED BY ROTATING DISK

HOLOGRAM ERASING METHOD AND HOLOGRAM ERASING APPARATUS

CROSS-REFERENCE TO RELATED APPLICATION

This application claims priority under 35 USC 119 from Japanese Patent Application No. 2003-197376, the disclosures of which are incorporated by reference herein.

BACKGROUND OF THE INVENTION

1. Field of the Invention

The present invention relates to a hologram erasing method and a hologram erasing apparatus, particularly to the hologram erasing method and the hologram erasing apparatus for selectively erasing a hologram, which has been already recorded, from an optical recording medium.

2. Description of the Related Art

Holographic memory has been receiving attention as a computer file memory of the next generation. The holographic memory has both large capacity derived from a three-dimensional recording region and high speed derived from a two-dimensional batch recording and reproducing method.

In the holographic memory, a plurality of data pages can be recorded by multiplexing the data pages in the same volume, and the data can be read out in a page at a time. The digital data can be recorded and reproduced, not as an analog image but as binary digital data "0,1" digitized in the form of "bright, dark" and recorded and reproduced in the form of the hologram.

In recent years, various proposals on a specific optical system of this digital holographic memory system, S/N ratio or bit error rate evaluations based on volume multiplex recording methods, and two-dimensional coding have been made. Also, studies have been made from a more optical engineering point of view such as influence of aberration of the optical system.

Figure 7:
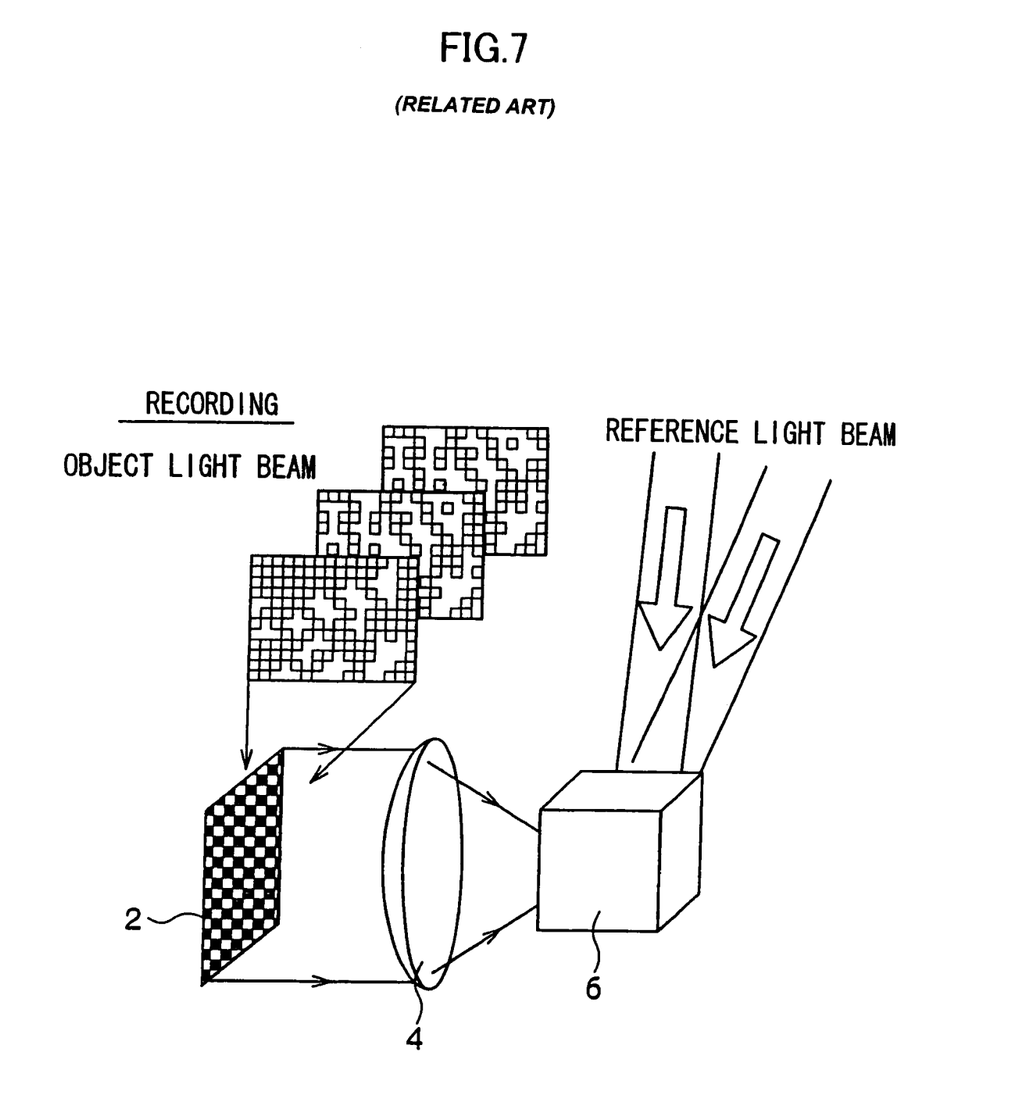
FIG. 7 is a view illustrating an angle multiplex recording method.

FIG. 7 is a figure showing an angle multiple recording method which is one of the volume multiplex recording methods. In the case of the angle multiple recording method, the hologram is recorded by condensing a digital data page (signal light beam) 2 with a lens 4 and irradiating the same volume within a hologram recording medium 6 with a reference light beam and the signal light beam at the same time. In the case of the multiple recording, the signal light beam is recorded by changing an incident angle of the reference light beam. When reading out the data (reproducing), the objective hologram is accessed by addressing the data with the reference light beam used for the recording, and the data page can be reproduced.

Figure 8A:
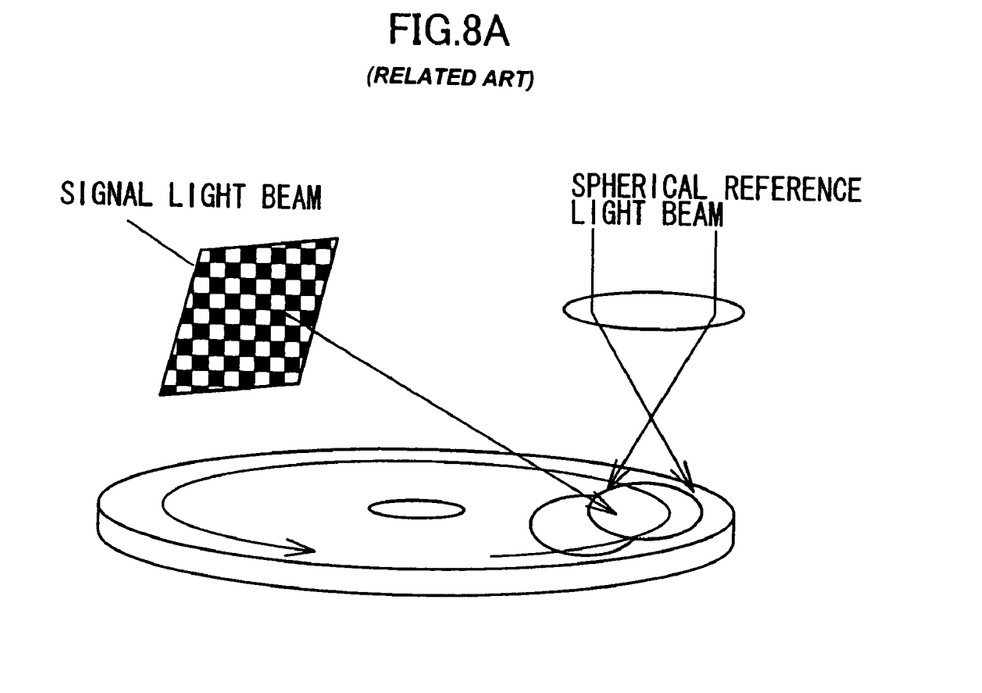
FIGS. 8A to 8B are views each illustrating a shift multiplex recording method.
Figure 8B:
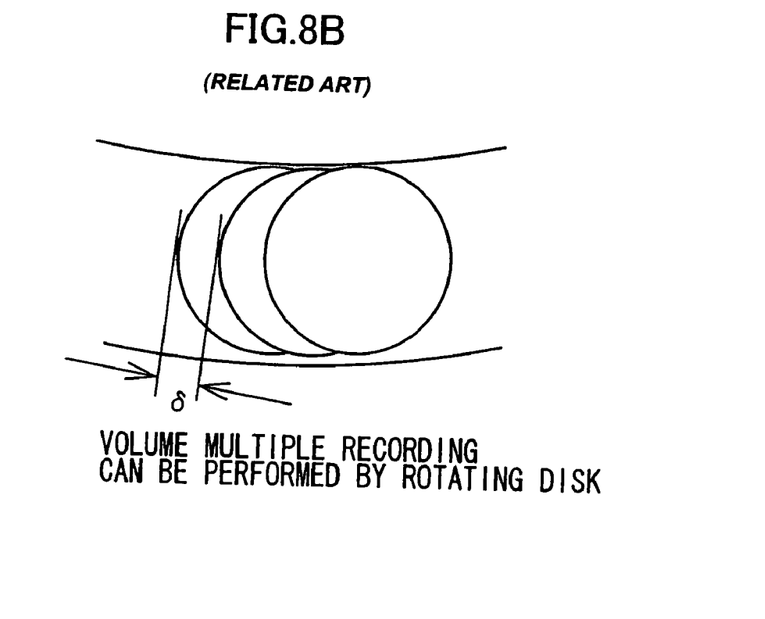

FIGS. 8A and 8B are figures explaining a shift multiple recording method. In this method, a light wave whose wavefront is spacially changed, such as a spherical wave and a speckle pattern, is used as the reference light beam. In the case where such a reference light is used, a Bragg condition for the reproducing can be avoided by only slightly shifting a position of the recording medium by the amount of shift δ from the recording spot (FIG. 8B), and a new hologram can be recorded there. That is to say, the multiple recording of the hologram can be performed in substantially the same volume by slightly shifting the recording medium.

As described above, in the digital holographic storage, high-speed transfer by the two-dimensional batch recording and reproducing method and the increase in the recording capacity by the volume recording can be realized at the same time.

Photopolymer materials, photorefractive materials, photochromic materials such as azopolymer materials, and the like have been actively researched and developed as medium material of the holographic memory. Among these materials, the recording medium using the photorefractive materials or the azopolymer materials can effect erasing the recorded data and recording new data.

Since the recording can be repeatedly performed in these rewritable type recording mediums, in addition to the large-capacity information storage, it is greatly hoped that the rewritable type medium will be utilized as backup memory for hard disk drives or the like.

Conventionally, when the case where the data is erased from the rewritable type recording medium, most generally the erasing is performed by destroying recorded holograms by uniformly irradiating the whole recording region with light. In the recording medium using the photorefractive materials or the azopolymer materials, the holograms can be also erased at once by heating the recording medium and holding the recording medium at a high temperature.

However, in the method in which the recorded information is erased at once, for the recording mediums having large capacities of more than 100 GB, there is a problem in that a long time is required to overwrite new information after all of the information is erased. Therefore, from a practical point of view, it is desirable that only the unnecessary data be erased and the new data be overwritten.

In this case, generally a predetermined hologram is erased by irradiating the predetermined hologram with the reference light beam used for the recording. In this method, a specific apparatus is rendered unnecessary by using the reference light beam for erasing the data, and the hologram can be selectively destroyed by irradiating only the predetermined region with the reference light beam.

Moreover, a method has also been proposed in which a predetermined information is selectively erased by irradiating magneto-optical recording medium, in which medium an interference pattern has been recorded by magnetic reversal of a part irradiated with the light, with the signal light beam and the reference light beam used for the recording, while a magnetic field is applied in a direction which is the reverse of the direction at the time of recording (Japanese Patent Application Laid-Open (JP-A) No. 2001-256654, paragraph Nos. 0078 to 0080).

However, in the method in which the hologram is erased by irradiating the hologram with the reference light beam, there is the problem shown below.

That is to say, in the hologram recording, a change in refractive index or a change in absorption of the medium is induced by irradiating the recording medium with interference fringes generated by the signal light beam and the reference light beam. Regarding light intensity of the interference fringes, the intensity of a strong part reaches several times that of the reference light beam. Accordingly, in order to completely erase the recorded hologram, the reference light beam having the intensity several times as high as that of the recording is necessary in the erasing process. Alternatively, it is necessary to make the reference light beam-irradiating time several times longer than that of the recording.

However, in the case where the hologram is recorded, power of a light source is generally used at full potential to record the hologram at high speed. Accordingly, it is difficult to further increase the laser power of the light source for the reference light beam during the erasing process. On the other hand, when the hologram is irradiated with the reference light beam for a long time during the erasing, high-speed transfer, which is one of merits in the holographic memory, is sacrificed.

In the method in which the information is selectively erased by the signal light beam and the reference light beam used for the recording of the magneto-optical recording medium, it is necessary that the same position as the recording be irradiated with the signal light beam, and there is the problem that position control becomes difficult as an mount of information increases. This method is the data erasing method in the magneto-optical recording in which the interference fringes are used as an assist light beam, and the method can not be applied to the usual hologram recording.

SUMMARY OF THE INVENTION

In view of the foregoing, the present invention provides a hologram erasing method and a hologram erasing apparatus for selectively and completely erasing a hologram recorded in the optical recording medium in a simple manner.

In order to achieve the above-described object, in a first aspect of the invention, a hologram erasing method comprises erasing a predetermined hologram by irradiating a recording region of the predetermined hologram recorded in an optical recording medium with a reference light beam and a signal light beam which holds random pattern data at the same time.

In a second aspect of the invention, a hologram erasing apparatus is configured so as to erase a predetermined hologram by irradiating a recording region of the predetermined hologram recorded in an optical recording medium with a reference light beam and a signal light beam, which holds random pattern data, at the same time.

In the above first aspect, the hologram is destroyed in a simple method in which, as at the time when the hologram is recorded, the recording region of the predetermined hologram is irradiated with the signal light beam and the reference light beam at the same time. Accordingly, the predetermined region of the optical recording medium can be irradiated with an erasing light beam (interference light beam between the signal light beam and the reference light beam) stronger than the case in which the erasing is performed by irradiating the predetermined region only with the reference light beam, and the hologram can be selectively erased in a simple manner.

In addition, the hologram to be erased can be uniformly destroyed, as a whole, by using the signal light beam holding the random pattern data (data having no periodicity).

When the signal light beam having the high periodicity is used as the erasing light, there arises a problem that the hologram to be erased can not be destroyed as a whole, in a satisfactory manner, because the signal light beam has the spatially discrete intensity on the recording surface. As described above, the hologram to be erased can be completely erased, as a whole, by using the random pattern for the signal light beam.

In the above hologram erasing method of the first aspect, it is preferable that the signal light beam further holds data indicating that the recording region is a hologram erasing region. By this indication, it can be easily determined whether the data can be recorded in the region or not.

Further, it is preferable that the signal light beam further holds data indicating the number of times of hologram erasing. The optical recording medium is generally degraded by the data erasing. When the number of times of erasing exceeds the predetermined number, the region is no longer suitable for the recording of the hologram. By employing the aforementioned indication, it can be easily determined whether the data can still be recorded in the region or not.

According to the hologram erasing method of the present aspect, the predetermined hologram can be erased by applying exposure energy, which is no lower than the exposure energy during recording, to the recording region of the predetermined hologram by using the signal light beam and the reference light beam.

It is preferable that an intensity distribution of the reference light beam on the optical recording medium substantially coincides with the intensity distribution of the signal light beam. In the case where the intensity distribution of the reference light beam on the optical recording medium substantially coincides with the intensity distribution of the signal light beam, only the region where the predetermined hologram has been recorded can be exposed and other regions are prevented from being unnecessarily exposed. Accordingly, only the predetermined hologram can be selectively erased without destroying the adjacent holograms.

In the case where the hologram is recorded in a form of angle multiplex recording, the recording region of the predetermined hologram is irradiated with the reference light beam having the same angle as a reference light beam used in recording the hologram, when the hologram is erased. Accordingly, a recording position of the predetermined hologram is specified and the hologram can be selectively erased.

In the case where the hologram is recorded in the form of shift multiplex recording, the predetermined hologram can be erased by irradiating the recording region of the predetermined hologram with the reference light beam having the same wavefront and position as the reference light beam used in recording the hologram.

DETAILED DESCRIPTION OF THE INVENTION

One embodiment, in which the hologram erasing method of the present invention is applied to data erasing in digital hologram storage, will be described in detail below referring to the accompanying drawings.

(Fourier Transform Hologram)

Figure 1:
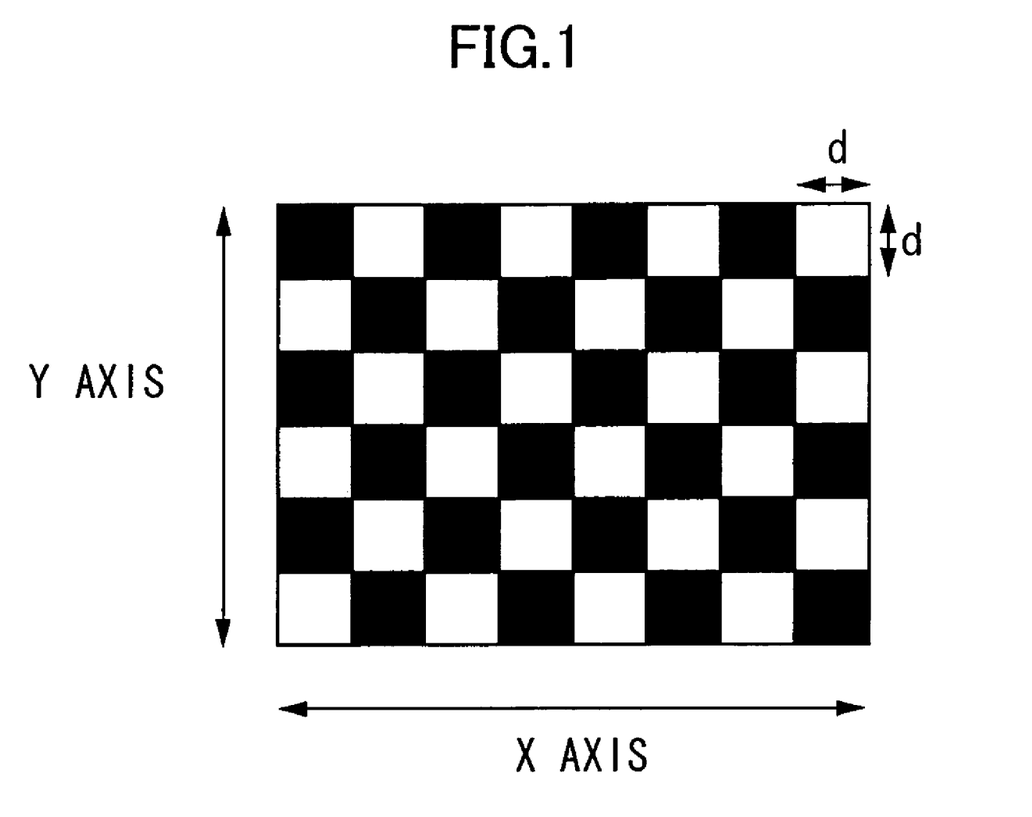
FIG. 1 is a view showing an example of data image to be recorded.
Figure 2:
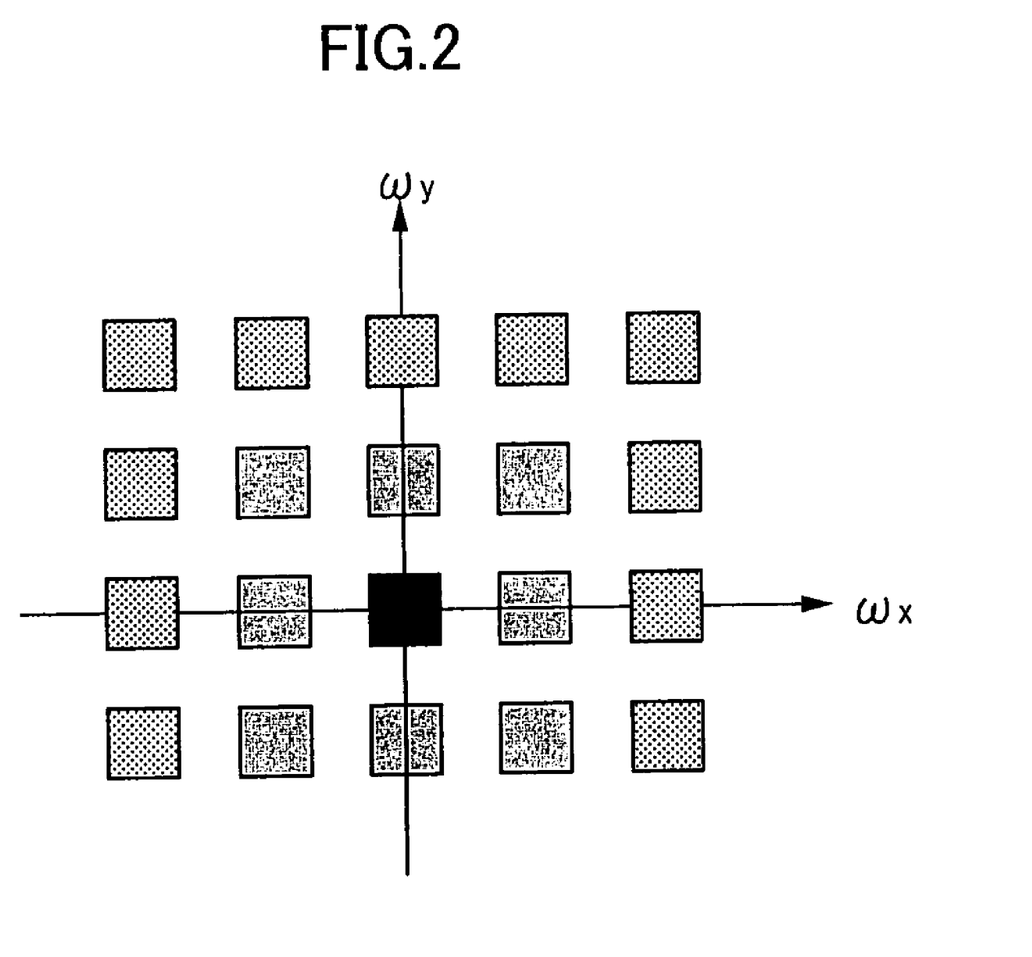
FIG. 2 is a view showing a Fourier transform image of a signal light beam holding the data image shown in FIG. 1.

For example, an image as shown in FIG. 1 is adopted as a data page to be recorded as the hologram. A white part in FIG. 1 indicates data "1" and a black part in FIG. 1 indicates data "0". This allows binary digital data to be recorded in each page. In this case, a size of one pixel of d by d corresponds to one bit data. In the case where such data image as described above is recorded in the form of the hologram, a Fraunhofer diffraction image of the data image is recorded by the lens in order to improve the recording density. As the Fraunhofer diffraction image of the data image is proportional to the Fourier transformation of an amplitude distribution of the data image, the Fraunhofer diffraction image is referred to as a Fourier transform hologram. FIG. 2 shows the Fourier transform image of the data image shown in FIG. 1.

The spread $\zeta$ of the Fraunhofer diffraction image is indicated by the following expression (1).

$$\zeta = k\lambda f\omega_x \quad (1)$$

Where k is a constant of proportionality, $\lambda$ is a wavelength of the signal light beam, f is a focal distance of a lens for Fourier transformation, and $\omega_x$ is a spatial frequency of the signal light beam.

Recording the digital data at high density can be made possible by packing bit data as much as possible in each page by decreasing an area of one pixel of the data image shown in FIG. 1, i.e. by decreasing a value of d. Accordingly, in addition to the high-density recording, the recording and reproducing at a high speed can be realized.

However, when the area of one pixel is decreased, the Fourier transform image of the data image (signal light beam) spreads on the recording medium according to the above formula (1). This is attributed to an increase in a spatial frequency $\omega_x$ ($\propto 1/d$) when the size of the data image of signal light beam becomes small, i.e., when d is decreased. The spread of the Fourier transform image disturbs the high-density recording.

The method of decreasing a wavelength $\lambda$, the method of forming the Fourier transform image of the signal light beam by using the lens having a short focal distance f, and the like have been proposed as the method of avoiding the spread of the Fourier transform image. However, even if the Fourier transform image is decreased by shortening the wavelength of the light source or the focal distance of the lens, the Fourier transform image fundamentally has the infinite spread on the focal plane.

Therefore, the present invention proposes that, in the Fourier transform image shown in FIG. 2, only the minimum Fourier transform component required for the data reproduction is recorded. This enables the micronization of the recording region to be recorded.

The spread in an x-axis direction of the Fourier transform image shown in FIG. 2 corresponds to the spatial frequency $\omega_x$ ($\propto 1/d$) in the x-axis direction of the data image shown in FIG. 1. When the Fourier transform image shown in FIG. 2 is seen in the x-axis direction, the Fourier transform image spreads toward positive and negative directions in symmetrical with respect to a zero-dimensional light beam ($\omega_x=0$). The spread in the y-axis direction is similar to that in the x-axis direction.

As described above, the spatial frequency has positive and negative values, and one of the positive and negative components is enough for reproducing the data image of the signal light beam. Accordingly, for example, the micronization of the recording region to be recorded can be achieved by recording only the positive component including the zero-order light beam.

Since the Fourier transform image of the signal light beam includes many spatial frequency components originating from a pixel pitch of the signal light beam, even if a harmonic component is cut, the signal light beam can be reproduced without error.

Explanation of this phenomenon is as follows: assuming that the spatial frequency of the image data initially takes an adequately normalized value, the Fraunhofer diffraction image shown in FIG. 2 becomes the Fourier transform image of the signal light beam itself, so that k in the formula (2) is 1 and the spread $\zeta$ of the Fraunhofer diffraction image is indicated by the following formula (3).

$$\zeta = \lambda f \omega x \quad (2)$$

When a trial calculation of the spread $\zeta$ of the diffraction image is made by substituting the parameters of the formula (2) with the specific numerical values, for example, in the case where the wavelength $\lambda$ is 532 nm, the focal distance f is 50 mm, and the spatial frequency $\omega_x$ is 71 lines/mm (corresponding to the pixel of 14 μm by 14 μm), the spread $\zeta$ of the diffraction image becomes about 2 mm, and the spread $\zeta$ of the diffraction image becomes 4 mm by considering the positive component and the negative component.

In consideration of the experiment results obtained by the present inventors, recording only the zero-order to the second-order components in the positive and negative directions of the Fourier transform image satisfactorily miniaturizes the recording region and enhances the S/N ratio high in reproduction. That is to say, the miniaturization of the recording region can be achieved without losing the data by effecting the hologram recording, with the reference light beam, of the Fourier transform component in which component the spread $\zeta$ from the zero-order light beam of the Fourier transform image of the signal light beam is defined by the following formula (3).

$$0 \leq \zeta \leq 2f\lambda/d \quad (3)$$

The recording region can be miniaturized to the smallest size by recording only the zero-order component of the Fourier transform image. However, in this case, the loss of data occurs and the data image of the signal light beam can not be read out. In order prevent loss of data, it is necessary to record at least the zero-order and first-order components of the Fourier transform image.

When the Fourier transform image including the high order components such as a fourth order and a fifth order is recorded, the data image of the signal light beam can be read out at a high S/N ratio. However, then the recording region cannot be sufficiently miniaturized and the recording capacity cannot be sufficiently increased.

In practice, when the Fourier transform image including component thereof up to the first order is recorded, reading error is substantially eliminated during reproducing the data image. Further, when the recording including up to the second-order or third-order component is performed, the data image of the signal light beam can be read at a sufficiently high S/N ratio.

(Recording, Reproducing, and Erasing of the Hologram)

Figure 3:
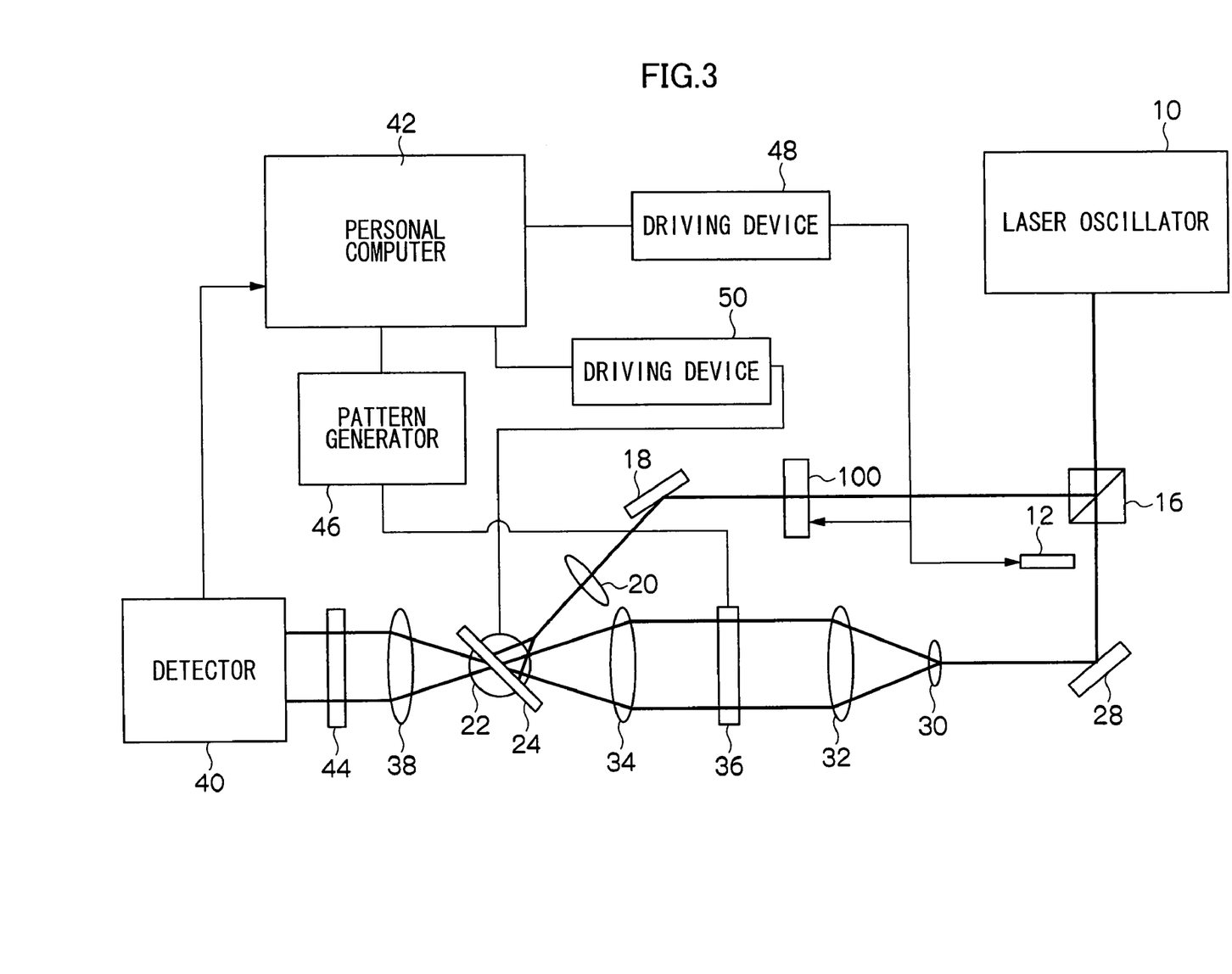
FIG. 3 is a schematic view showing a configuration of a hologram recording reproducing apparatus used in one embodiment.

The hologram recording and reproducing apparatus to which the hologram erasing method of the invention can be applied will be described below referring to FIG. 3. Needless to say, the apparatus can be used for recording a hologram and reproducing the recorded hologram.

A laser 10 for oscillating the laser beam which is of the coherent light is provided in the hologram recording and reproducing apparatus. A polarizing beamsplitter 16 is arranged on a laser beam irradiating side of the laser 10. The polarizing beamsplitter 16 separates the laser beam into two light beams of the light beam for the reference light beam and the light beam for the signal light beam by transmitting a P-polarized light beam and reflecting an S-polarized light beam.

A reflecting mirror 18, which reflects the laser beam for the reference light beam to deflect the optical path thereof toward a direction of the hologram recording medium, and an objective lens 20 which condenses the reference light beam are arranged in order on a light reflection side of the polarizing beamsplitter 16. The lens 20 is arranged so that the lens 20 can be introduced into the optical path and retreated from the optical path. It is acceptable that the recording surface is directly irradiated with the reference light beam after the lens 20 has been retreated. Alternatively, the recording surface may be irradiated with the reference light beam after the lens 20 is introduced to convert the reference light beam into an appropriate size by the lens 20.

A holographic optical element 100 in which the kinoform has been recorded is arranged between the polarizing beamsplitter 16 and the reflecting mirror 18 such that the hologram optical element 100 can be introduced into/retreated from the optical path. The kinoform is designed so that a reference light beam having random phase distribution, as well as the shape and intensity corresponding to the profile of the signal light beam for erasing, is generated.

In the case in which the shift multiplex recording is performed by the spherical reference wave, it will acceptable that an objective lens having large NA is introduced as the lens 20 and the hologram optical element 100 is omitted. In the case in which the shift multiplex recording is performed by the phase correlation multiplexing method, a reference light beam can be generated by introducing the holographic optical element 100. It should be noted that, in the case in which the phase correlation multiplexing method is adopted, it is acceptable that the size of the reference light beam is adjusted on the hologram recording surface by using the lens 20 together with the holographic optical element 100.

However, the lens 20 is not required when the kinoform recorded in the holographic optical element 100 is optimally designed. In any case, the holograms can be recorded, in a multiplex manner, into substantially the identical volume by slightly moving a holographic medium 24.

An x-z stage 22 is provided on a laser beam condensing side of the objective lens 20. The x-z stage 22 includes a stepping motor for rotating a hologram recording medium 24 formed in the shape of a disk in a z-plane. The hologram recording medium 24 is irradiated with the S-polarized light beam as the reference light beam through the objective lens 20.

A shutter 12 for blocking the P-polarized light beam transmitted through the polarizing beamsplitter 16 is arranged on a light beam transmission side of the polarizing beamsplitter 16 so that the shutter 12 can be introduced into/retreated from the optical path. A reflecting mirror 28 and a lens system including lenses 30, 32, and 34 are arranged in order on the light beam transmission side of the shutter 12. The reflecting mirror 28 reflects the laser beam for signal light beam at a reflection angle of 45° to deflect the optical path thereof toward the direction of the hologram recording medium.

A transmission type of spatial light modulator 36 is arranged between the lens 32 and the lens 34. The spatial light modulator 36 includes a liquid crystal display element and the like, and modulates the laser beam for the signal light beam in accordance with the supplied recording signal in each page to generate the signal light beam for effecting recording on each page of the hologram.

The lenses 30 and 32 collimate the laser beam to form the light beam having a larger diameter, and the spatial light modulator 36 is irradiated with the collimated light beam having the larger diameter. The lens 34 condenses the P-polarized light beam, which has been modulated by and transmitted through the spatial light modulator 36, on the hologram recording medium 24, for forming the signal light beam. In recording the hologram, the hologram recording medium 24 is simultaneously irradiated with the signal light beam and the reference light beam.

Since the P-polarized light beam is used as the signal light beam and the S-polarized is used as the reference light beam, the polarization direction of the signal light beam is orthogonal to the polarization direction of the reference light beam at the time when each page of the hologram is recorded.

It is acceptable that the S-polarized light beam is used as the signal light beam and the P-polarized light is used as the reference light beam. Further, it is acceptable that the signal light beam and reference light beam whose polarization planes are parallel to each other is used. Yet further, it is acceptable that circularly polarized light beams which are rotated in directions different from each other is used as the signal light beam and the reference light beam, respectively.

A lens 38, an analyzer 44 which selects a light beam in a predetermined polarization direction (for example, 0° polarized component, 45° polarized component, or 90° polarized component) from the reproducing light beams and allows the selected light beam to transmit itself, and a detector 40 which includes an imaging device such as CCD and converts the received reproducing light beam into an electric signal to output the signal, are arranged on a reproducing light beam transmission side of the hologram recording medium 24. The detector 40 is connected to a personal computer 42.

The personal computer 42 is connected to the spatial light modulator 36 by way of a pattern generator 46 which generates a pattern in accordance with the recording signal supplied from the personal computer 42 at predetermined timing.

The personal computer 42 is connected to a driving device 48. The driving device 48 drives the shutter 12 and the hologram optical element 100, resepectively, so that the shutter 12 and the hologram optical element 100 are each separately introduced into the optical path. Or, the driving device 48 makes each of the shutter 12 and the hologram optical element 100, which have been introduced into the optical path, retreat from the optical path. Further, the personal computer 42 is connected to a driving device 50 which drives the x-z stage 22.

Next, a hologram recording process and a hologram reproducing process in which the above hologram recording and reproducing apparatus is used will be described below. In the present embodiment, the shift multiplexing method in which the holographic optical element 100 is used for the generation of the reference light beam will be described. By using the holographic optical element 100, the phase of the reference light beam becomes random, and the intensity distribution of the reference light beam satisfies the expression (3) to substantially correspond to the signal light beam required for the recording.

In recording the hologram, while the personal computer 42 drives the driving device 48 to make the shutter 12 retreat from the optical path so that the laser beam can pass through, the driving device 50 drives the stepping motor of the x-y stage 22 to rotate the hologram recording medium at predetermined rotational speed.

The laser beam oscillated from the laser 10 is separated into two light beams by the polarizing beamsplitter 16. The laser beam transmitted through the polarizing beamsplitter 16 is reflected by the reflecting mirror 28 and collimated by the lenses 30 and 32. The spatial light modulator 36 is irradiated with the resulting laser beam for the signal light beam.

The pattern generator 46 generates a pattern in accordance with the recording signal supplied from the personal computer 42 and inputs the pattern to the spatial light modulator 36. The personal computer 42 supplies the recording signal of each page at the predetermined timing so that each page of the hologram is recorded from the recording start position with an interval of the amount of shift δ, while the hologram recording medium 24 is rotated.

In the spatial light modulator 36, the laser beam for the signal light beam is intensity-modulated in accordance with the generated pattern and the signal light beam is generated. The Fourier transformation is performed to the generated signal light beam by the lens 34 and then the hologram recording medium 24 is irradiated with the resulting signal light beam.

At the same time, in the laser beam reflected by the polarizing beamsplitter 16, an appropriate wavefront is formed by the holographic optical element 100 and the size of the beam diameter is adjusted by the lens 20. The resulting light beam is irradiated, as the laser beam for the reference light beam, on the region which is irradiated with the post-Fourier transformation signal light beam in the hologram recording medium 24. This allows the signal light beam and the reference light beam to interfere with each other in the hologram recording medium 24, and the Fourier transform hologram is recorded in the hologram recording medium 24. The holograms of the plurality of pages can be recorded in the same region, with the holograms overlapped, by carrying out the recording in a manner that the disk-shaped hologram recording medium 24 is rotated during the recording.

In reproducing the hologram, the personal computer 42 drives the driving device 48 to introduce the shutter 12 into the optical path. This allows the laser beam which has been transmitted through the polarizing beamsplitter 16 to be blocked by the shutter 12, so that the hologram recording medium 24 in which the hologram is recorded is irradiated with only the reference light beam.

The reproducing light beam diffracted by the hologram recording medium 24 is reversely Fourier-transformed by the lens 38, and only the reproducing light beam having a predetermined polarized component is selectively transmitted through the analyzer 44 and imaged on the detector 40. The reproducing light beam received by the detector 40 is converted into an electric signal by the detector 40. The obtained electric signal is inputted in the personal computer 42, and the reproduced data image is displayed on a display (not shown) provided in the personal computer 42.

Next, the processing of erasing the recorded hologram will be described. In erasing the hologram, the personal computer 42 drives the driving device 48 to make the shutter 12 retreat from the optical path so that the laser beam can pass through.

The driving device 50 drives the stepping motor of the x-y stage 22 to make the hologram recording medium 24 rotate and stops the hologram recording medium 24 at a predetermined position so that the recording region of the hologram to be erased is irradiated with the signal light beam for erasing.

In the same way as the hologram recording, the laser beam is oscillated from the laser 10 and transmitted through the polarizing beamsplitter 16. Then, the laser beam is reflected by the reflecting mirror 28 and collimated by the lenses 30 and 32, and the resulting laser beam is irradiated on the spatial light modulator 36.

The pattern generator 46 generates a random pattern in accordance with the erasing signal supplied from the personal computer 42 and inputs the pattern in the spatial light modulator 36. The personal computer 42 supplies the erasing signal, in a state in which the hologram recording medium 24 is stopped.

In the spatial light modulator 36, the laser beam for the signal light beam is amplitude-modulated in accordance with the generated random pattern and the signal light beam for erasing (data page) is generated. The Fourier transformation is performed to the generated signal light beam by the lens 34 and the recording region in which the hologram to be erased has been recorded, in the hologram recording medium 24, is irradiated with the resulting signal light beam.

At the same time, the holographic optical element 100 is irradiated with the laser beam reflected from the polarizing beamsplitter 16 (which laser beam is to become the laser beam for the reference light beam). The holographic optical element 100 generates a reference light beam from the laser beam for the reference light beam, which reference light beam has a random phase and the shape and intensity provided according to the profile of the signal light beam for erasing.

In the case where the Fourier transform hologram is recorded, the hologram recording is generally performed at a defocused position where the recording medium is slightly shifted from the focal position of the lens in order to suppress the intensity of the zero-order diffraction light beam of the signal light beam on the recording surface. The signal light beam is condensed to a certain degree by the lens, and the recording medium is irradiated with the resulting signal light beam.

A diffraction pattern corresponding to a pattern (periodicity) of the data image appears on the recording surface. The spread of the diffraction pattern is maximized when the data image is a random pattern.

Figure 4:
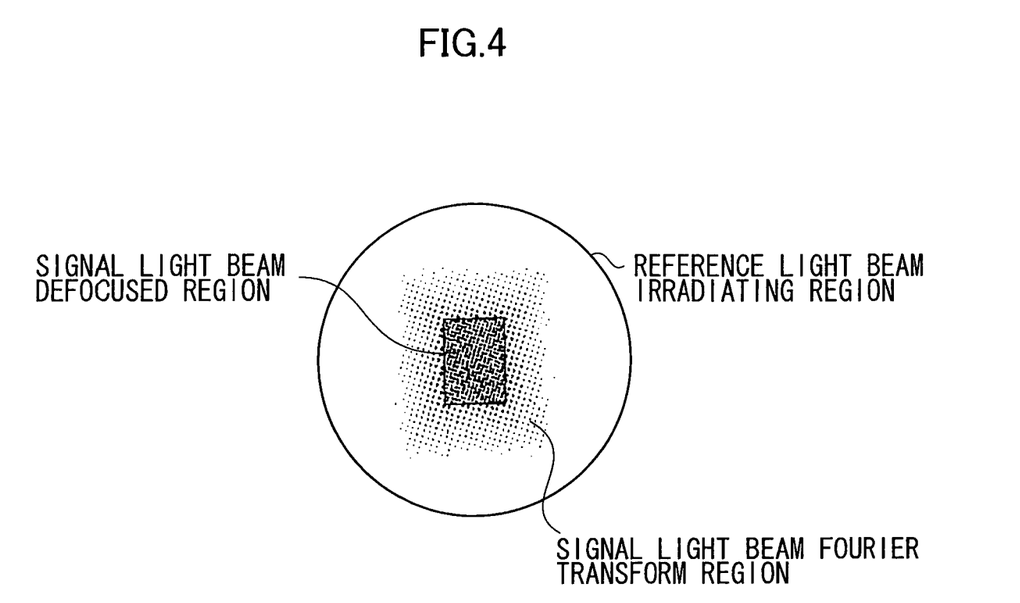
FIG. 4 is a schematic view showing a relationship between a signal light beam irradiating region and a reference light beam irradiating region.

In general, a relatively broad region is irradiated with the reference light beam so that the entire region irradiated with the signal light beam is reliably irradiated with the reference light beam. For example, in the case where the shift multiplex recording is performed, as shown in FIG. 4, a circular region larger than the signal light beam irradiated-region is irradiated with the reference light beam.

However, in the case where the hologram is erased, when the region larger than the signal light beam irradiated-region is irradiated with the reference light beam, there is a possibility that regions of the recording medium other than the region where the hologram is to be erased is also exposed and thus the adjacent holograms therein to be preserved may be destroyed.

In order to prevent such an inconvenience from occurring, a method has been proposed in which the spread of the unnecessary erasing light beam is blocked by arranging an aperture having an appropriate shape in front of the hologram recording medium.

However, in this case, there is a demerit that the number of parts is increased. In order to allow two light fluxes of the reference light beam and the signal light beam each having different optical paths to transmit an aperture and simultaneously block the spread of the unnecessary light beam, at the time of recording, there inevitably arises a constraint that the aperture must be positioned close to the hologram recording medium to a degree that the aperture is nearly in contact with the hologram recording medium. However, in the case where the large-capacity recording is to be performed to the hologram recording medium, it is necessary to move the medium and the interference between the medium and the aperture will become a problem.

Therefore, a reference light beam having substantially the same intensity distribution as that of the signal light beam for erasing is generated, and only substantially the same region as the region irradiated with the signal light beam (i.e., the signal light beam defocused region) as shown in FIG. 4 is irradiated with the reference light beam. Accordingly, only the region where the hologram to be erased has been recorded can be exposed, and excessive regions (or regions which should not be exposed) will not be exposed. Consequently, only the predetermined hologram can be selectively erased without destroying the adjacent holograms.

The generated reference light beam is condensed by the lens 20, and the region in the hologram recording medium 24 which is irradiated with the post-Fourier transformation reference light beam is irradiated with the generated reference light beam. Accordingly, the signal light beam and the reference light beam interfere with each other in the hologram recording medium 24, and the Fourier transform hologram recorded in the region is destroyed and erased by the interference light beam. That is to say, the data page for erasing including the random pattern is overwritten and the original data page is erased.

Figure 5:
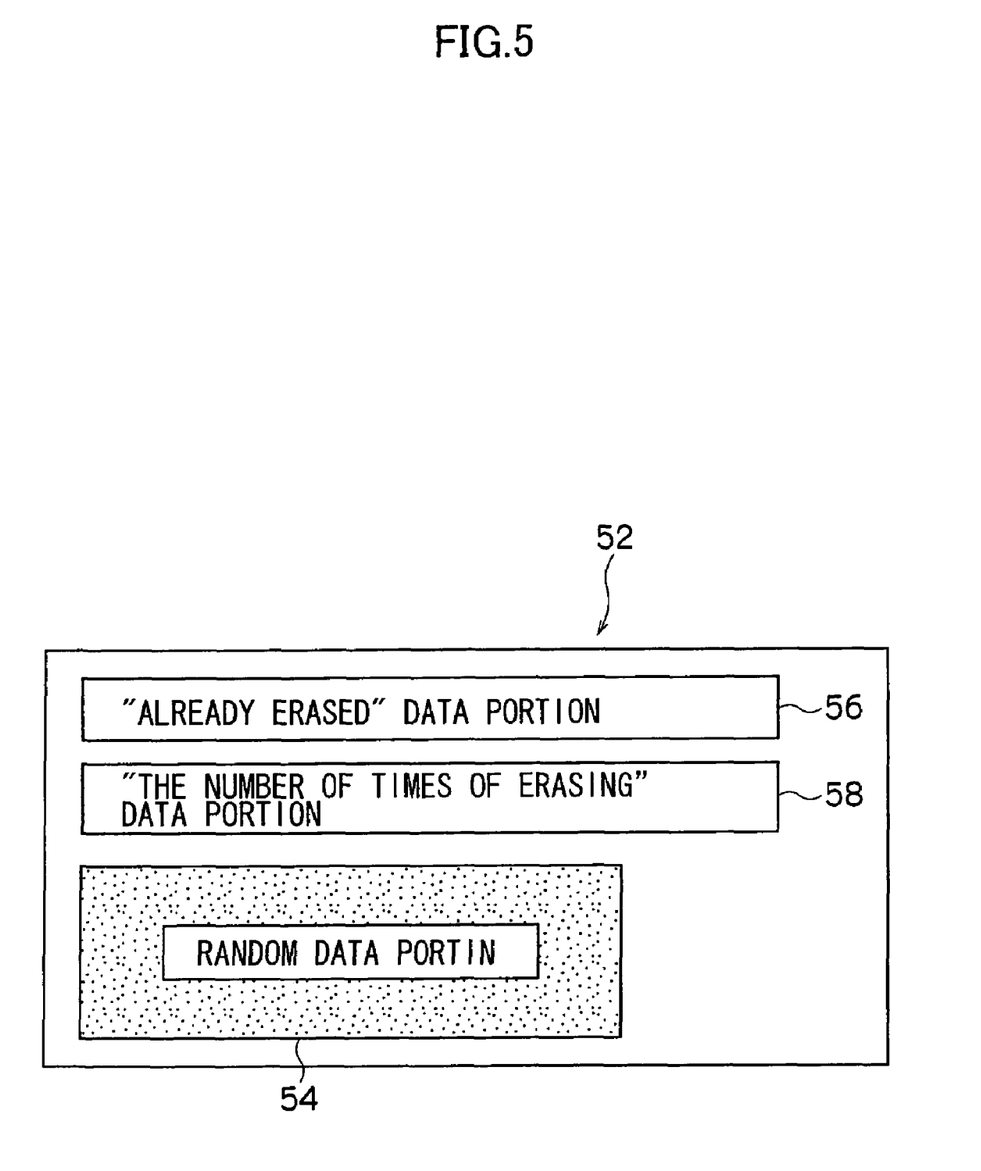
FIG. 5 is a view showing an example of data pages for erasing.

As shown in FIG. 5, in a data page for erasing 52, data 56 indicating that the page is an "already erased" region can also be written, in addition to a random pattern 54. By this indication, it can be easily determined whether new data can be recorded in the region or not, when data is to be overwritten or additional data is to be written.

Further, it is accepted that data 58 indicating the number of times of erasing is written in the data page for erasing 52. Accordingly, it can be decided that the recording should not be performed into a predetermined region, when the number of times of erasing at the predetermined region exceeds the maximum number of times of rewriting, which number may vary depending on type of the optical recording medium. That is to say, by this indication, it can be easily determined whether data can be recorded in the region or not.

(Hologram Recording Medium)

Figure 6A:
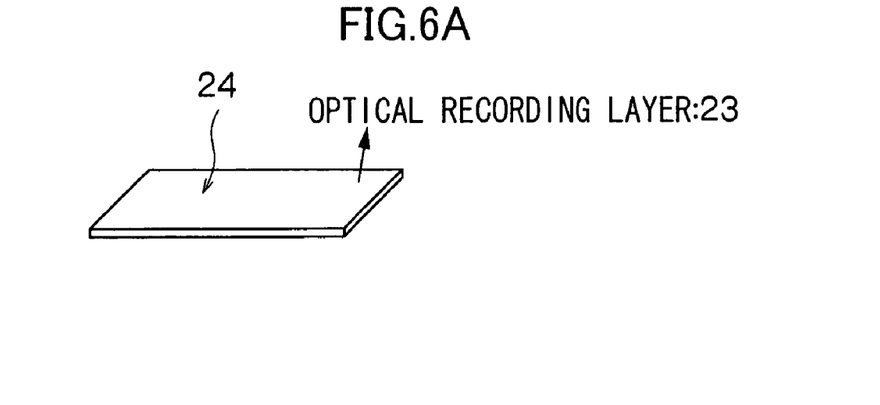
FIGS. 6A to 6C are schematic views each showing a structure of a hologram recording medium.
Figure 6B:
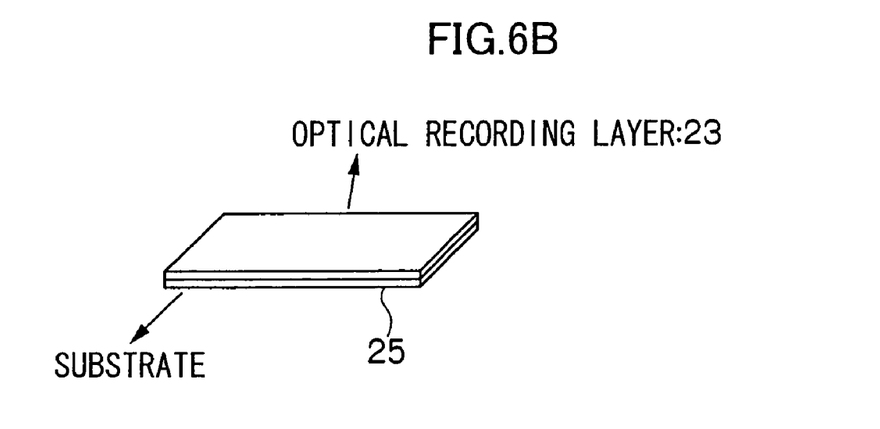
Figure 6C:
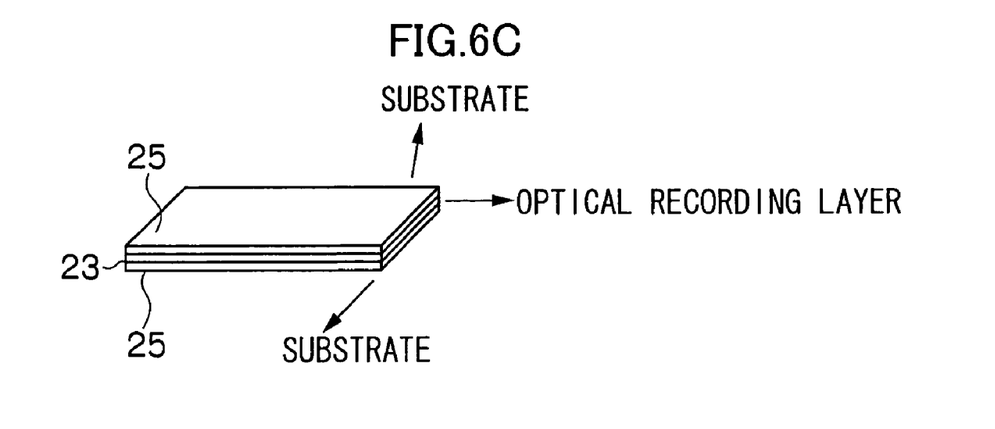

FIG. 6 shows a preferred structure of the hologram recording medium (optical recording medium) 24. The hologram recording medium of the embodiment is formed in the shape of the disk. Note that FIG. 6 shows a part of the disk, cut out in a rectangular shape.

As shown in FIG. 6A, the hologram recording medium 24 includes an optical recording layer 23 molded in the form of a thick film and having thicknesses not lower than, e.g. 100 μm. In the case where the optical recording layer does not have sufficient strength, it is acceptable that a substrate 25 made of a plate-shaped transparent medium such as quartz or plastic is provided on one side or both sides of the optical recording layer 23, as shown in FIG. 6B or FIG. 6C.

Any material can be used for the optical recording layer, i.e. for the photosensitive layer, as long as the material is a photorefractive material or a polarization sensitive material, which shows a change in photoinduced-refractive or photoinduced-dichroism and maintains such a change in photoinduced-refractive or photoinduced-dichroism at the room temperature. A macromolecule having a group capable of effecting photoisomerization in a side chain thereof is preferable as the material. For example, a material containing at least one type of polymer selected from the polyester group, which polymer has a group capable of effecting photoisomerization in a side chain thereof (e.g., a material having the azobenzene structure, is preferable for the optical recording layer.

A principle of photoinduced-birefringence will be described below, with reference to azobenzene as an example. Azobenzene repeats an isomerization cycle of trans-cis-trans by light beam irradiation. A number of azobenzene molecules having the trans configuration is present in the optical recording layer before the light beam irradiation. These molecules are randomly oriented and macroscopically isotropic.

When these azobenzene molecule is irradiated with linearly polarized light beam, the azobenzene molecule having an absorption axis in the same direction as the polarized direction is selectively isomerized from the trans-form to cis-form. The azobenzene molecules having the absorption axis in the direction orthogonal to the polarized direction, which have been relaxed in the trans-form, no longer absorb the light and are fixed at that state. As a result, macroscopic anisotropies in the absorption coefficient and the refractive index, i.e. the dichroism and the birefringence are induced.

In the macromolecule having the group capable of effecting photoisomerization, the orientation of the macromolecule itself is changed by the photoisomerization and the large birefringence can be induced. The birefringence induced in the above-described manner is stable at a temperature no higher than a glass transition temperature, and the resulting birefringence is preferable for recording each page of the hologram.

Polyester having cyanoazobenzene in a side chain thereof represented by the following chemical formula (JP-A No. 10-340479) is preferable for the material for recording a hologram by utilizing the above-mentioned mechanism. In this polyester, the polarized direction of the signal light beam can be recorded as the hologram by utilizing the photoinduced-anisotropy caused by the photoisomerization of cyanoazobenzene in the side chain. Further, hologram recording can be carried out at the room temperature. The recorded hologram can be stored semi-permanently.

In the above-described embodiment, the holographic optical element is designed to be introduced into the optical path of the reference light beam, when the hologram is recorded or erased. Accordingly, only the region required for the recording can be exposed by the reference light beam without exposing excessive regions or regions which should not be exposed. Therefore, the high-density recording can be realized.

As shown in FIG. 4, the Fourier transform image has an infinite spread (the signal light beam Fourier region) on the focal plane. However, as described above, only recording the minimum Fourier transform component inevitably required for the data reproduction, of the Fourier transform image as a whole, is enough for effecting recording of a hologram.

Accordingly, it is acceptable that the holographic optical element is introduced into the optical path of the reference light beam and only the region corresponding to the minimum Fourier transform component inevitably required for the data reproduction is irradiated with the reference light beam.

Although the kinoform was utilized in order to obtain the reference light beam having the shape and intensity which are in accordance with the profile of the signal light beam in the aforementioned embodiment, it will be also acceptable that other computer-generated holograms are utilized.

The computer-generated hologram is defined as one in which the amplitude and phase distributions of the object light beam from a virtual object are analyzed by calculation by the computer and recorded in a recording medium by an appropriate method. In producing a computer-generated hologram, an actual recording wavefront need not exist, and any arbitrary wavefront represented by a mathematical expression can be reproduced. The kinoform is a kind of computer-generated holograms, in which only the phase, of the amplitude and the phase of the object light beam, is recorded to reproduce an image.

As described above, according to the present invention, an excellent effect that a hologram recorded in an optical recording medium can be selectively and completely erased in a simple method is provided.

What is claimed is:

1. A hologram erasing method comprising:
    detecting, on an optical recording medium where holograms are recorded, a recording region where a hologram to be erased is recorded; and
    erasing the hologram by irradiating the detected recording region with a reference light beam and a random modulation signal light beam at the same time,
    wherein the signal light beam further holds data indicating that the recording region is a hologram erasing region.

2. A hologram erasing method according to claim 1, further comprising applying exposure energy, which is no lower than the exposure energy during recording, to the recording region of the hologram by using the signal light beam and the reference light beam.

3. A hologram erasing method according to claim 1 further comprising causing an intensity distribution of the reference light beam on the optical recording medium to substantially coincide with an intensity distribution of the signal light beam.

4. A hologram erasing method according to claim 3 further comprising generating the reference light beam, in which a phase is random and a shape and intensity are provided in accordance with a profile of the signal light beam.

5. A hologram erasing method according to claim 3 further comprising irradiating, with the reference light beam, only substantially the same region as the region which is irradiated with the signal light beam or as a signal light beam defocused region.

6. A hologram erasing method according to claim 1 further comprising irradiating the recording region of the hologram with the reference light beam having the same angle as a reference light beam used in recording the hologram, when the hologram is recorded by angle multiplex recording.

7. A hologram erasing method according to claim 1, further comprising irradiating the recording region of the hologram with the reference light beam having the same wavefront and position as a reference light beam used in recording the hologram, when the hologram is recorded by shift multiplex recording.

8. A hologram erasing method comprising:
    detecting, on an optical recording medium where holograms are recorded, a recording region where a hologram to be erased is recorded; and
    erasing the hologram by irradiating the detected recording region with a reference light beam and a random modulation signal light beam at the same time,
    wherein the signal light beam further holds data indicating the number of times of hologram erasing at the recording region.

9. A hologram erasing method according to claim 8, further comprising applying exposure energy, which is no lower than the exposure energy during recording, to the recording region of the hologram by using the signal light beam and the reference light beam.

10. A hologram erasing method according to claim 8 further comprising causing an intensity distribution of the reference light beam on the optical recording medium to substantially coincide with an intensity distribution of the signal light beam.

11. A hologram erasing method according to claim 10, further comprising generating the reference light beam, in which a phase is random and a shape and intensity are provided in accordance with a profile of the signal light beam.

12. A hologram erasing method according to claim 10, further comprising irradiating, with the reference light beam, only substantially the same region as the region which is irradiated with the signal light beam or as a signal light beam defocused region.

13. A hologram erasing method according to claim 8, further comprising irradiating the recording region of the hologram with the reference light beam having the same angle as a reference light beam used in recording the hologram, when the hologram is recorded by angle multiplex recording.

14. A hologram erasing method according to claim 8 further comprising irradiating the recording region of the hologram with the reference light beam having the same wavefront and position as a reference light beam used in recording the hologram, when the hologram is recorded by shift multiplex recording.

15. A hologram erasing method comprising:
    (a) separating a laser beam into a light beam for a reference light beam and a light beam for a signal light beam;
    (b) intensity modulating the light beam for the signal light beam in accordance with a random pattern, to generate a signal light beam for erasing;
    (c) generating the reference light beam, in which a phase is random and a shape and intensity are provided in accordance with a profile of the signal light beam for erasing, from the light beam for the reference light beam;
    (d) irradiating a recording region of a predetermined hologram in an optical recording medium with the signal light beam for erasing;
    (e) irradiating the region irradiated with the signal light beam for erasing with the reference light beam, at the same time as the region is irradiated with the signal light beam for erasing;
    (f) destroying the predetermined hologram recorded in the recording region by an interference light beam caused by interference between the signal light beam and the reference light beam.

16. A hologram erasing method according to claim 15 wherein the signal light beam irradiating process (d) includes irradiating the recording region with the signal light beam for erasing after the signal light beam for erasing is Fourier-transformed.

17. A hologram erasing method according to claim 15, wherein the reference light beam irradiating process (e) includes irradiating, with the reference light beam, only substantially the same region as the region which is irradiated with the signal light beam or as a signal light beam defocused region.

18. A hologram erasing method according to claim 15, wherein the signal light beam holds data indicating that the recording region is a hologram erasing region.

19. A hologram erasing method according to claim 15, wherein the signal light beam holds data indicating the number of times of hologram erasing at the recording region.

20. A hologram erasing method according to claim 15, wherein the hologram destroying process (f) includes applying exposure energy, which is no lower than the exposure energy during recording, to the recording region of the predetermined hologram by the interference light beam.

21. A hologram erasing method according to claim 15, further comprising irradiating the recording region of the predetermined hologram with the reference light beam having the same angle as a reference light beam used in recording the hologram, when the hologram is recorded by angle multiplex recording.

22. A hologram erasing method according to claim 15 further comprising irradiating the recording region of the predetermined hologram with the reference light beam having the same wavefront and position as a reference light beam used in recording the hologram, when the hologram is recorded by shift multiplex recording.

23. A hologram erasing apparatus comprising:
a light source for outputting a coherent light beam;
a beamsplitter for separating the coherent light beam into a light beam for a reference light beam and a light beam for a signal light beam;
a spatial modulator for intensity modulating the light beam for the signal light beam in accordance with a random pattern, to generate a signal light beam for erasing; and
a holographic optical element for generating the reference light beam, in which a phase is random and a shape and intensity are provided in accordance with a profile of the signal light beam for erasing, from the light beam for the reference light beam,
wherein a predetermined hologram is erased by irradiating a recording region of the predetermined hologram in an optical recording medium with the signal light beam and the reference light beam.

24. A hologram erasing apparatus according to claim 23, wherein the hologram erasing apparatus is configured to irradiate, with the reference light beam, only substantially the same region as the region which is irradiated with the signal light beam or as a signal light beam defocused region with.

* * * * *